(12) United States Patent
De'Longhi

(10) Patent No.: US 7,484,455 B2
(45) Date of Patent: *Feb. 3, 2009

(54) PASTA COOKING DEVICE AND METHOD

(75) Inventor: Giuseppe De'Longhi, Treviso (IT)

(73) Assignee: De'Longhi S.p.A., Treviso (IT)

( * ) Notice: Subject to any disclaimer, the term of this patent is extended or adjusted under 35 U.S.C. 154(b) by 457 days.

This patent is subject to a terminal disclaimer.

(21) Appl. No.: 10/519,703

(22) PCT Filed: Apr. 4, 2003

(86) PCT No.: PCT/EP03/03532

§ 371 (c)(1),
(2), (4) Date: Dec. 23, 2004

(87) PCT Pub. No.: WO2004/002280

PCT Pub. Date: Jan. 8, 2004

(65) Prior Publication Data

US 2005/0229789 A1  Oct. 20, 2005

(30) Foreign Application Priority Data

Jun. 28, 2002 (IT) .......................... MI2002A1431

(51) Int. Cl.
*A23L 1/00* (2006.01)
(52) U.S. Cl. .............................. 99/330; 99/332; 99/348; 99/409; 219/436; 219/439
(58) Field of Classification Search ........... 99/352–355, 99/325–333, 348, 403–418, 444–450; 219/436, 219/439
See application file for complete search history.

(56) References Cited

U.S. PATENT DOCUMENTS

| 4,951,558 | A | 8/1990 | Figliuzzi |
| 5,010,805 | A | 4/1991 | Ferrara |
| 5,590,583 | A | 1/1997 | Harrison |
| 5,611,265 | A | 3/1997 | Ronci et al. |
| 7,026,591 | B2 * | 4/2006 | De'Longhi .................. 219/725 |
| 7,105,780 | B2 * | 9/2006 | De'Longhi .................. 219/436 |

FOREIGN PATENT DOCUMENTS

EP    0 716 827    6/1996

* cited by examiner

*Primary Examiner*—Timothy F. Simone
(74) *Attorney, Agent, or Firm*—Andrew Wilford

(57) ABSTRACT

A pasta cooker has a base carrying a bowl having an electrical heater. A basket can move between a lower position immersed in water in the bowl and an upper position largely out of the bowl. A stirring element rotatably mounted on the basket carries a paddle projecting upward into the basket. A controller energizes the heater to bring the water in the bowl to a boil, then lowers the basket into it. The stirring element fits with a drive in the base so it can rotate and stir the water and any foodstuff in the bowl in the boiling water. After an interval preset in a timer elapses, the controller lifts the basket out of the bowl.

18 Claims, 6 Drawing Sheets

PASTA COOKING DEVICE AND METHOD

CROSS REFERENCE TO RELATED APPLICATIONS

This application is the US national phase of PCT application PCT/EP2003/003532, filed 4 Apr. 2003, published 8 Jan. 2004 WO 2004/002280, and claiming the priority of Italian patent application MI2002A001431 itself filed 28 Jun. 2002.

FIELD OF THE INVENTION

The present invention refers to a cooking device and procedure.

In particular, hereafter reference shall be made to a device and a procedure for cooking pasta. Nevertheless, it is clear that they are also equally applicable for cooking other dishes such as, for example, Chinese-style rice, Italian-style risotto, etc.

BACKGROUND OF THE INVENTION

Currently, the cooking of pasta is done with pans containing water which is usually made to boil by heating with a burner. When the water boils, the pasta is thrown into the pan and is left to cook for the necessary time. Then, when cooking is complete, the pasta is drained.

The devices of the conventional type have numerous drawbacks which can be summed up as the following. The use of burners, often gas-fired, can be dangerous in particular when the pan is not watched over. An unforeseen bubbling over of water or froth from the pan could, indeed, put out the flame without interrupting the gas supply. The consequences in this case are easy to imagine.

Moreover, conventional devices need to be watched over continuously also because the active presence of an operator to throw in the pasta, to stir, to drain, etc., is necessary. Otherwise the food obtained is of a very poor quality.

Moreover, conventional devices require substantial experience to achieve good results in particular with reference how much the pasta is cooked. In many cases, indeed, precisely due to lack of experience, the pasta is cooked for too long with very poor results.

OBJECT OF THE INVENTION

The technical task or object of the present invention is, therefore, that of providing a cooking device and procedure which allow the aforementioned technical drawbacks of the prior art to be eliminated.

In this technical task an object of the invention is that of providing a cooking device which can function, in complete safety and ensuring the quality of the food cooked, without the presence of a user being necessary to continuously watch over and/or actively operate, for example stirring the food.

Another object of the invention is that of providing a device which is very safe and which, in particular, does not require the use of flammable gas.

The last but not least object of the invention is that of providing a device and a procedure which allow various types of food, in particular pasta, to be cooked in an optimal manner, also when the user has very limited cooking experience and even allows people without any experience at all to cook pasta and other food in an optimal manner.

SUMMARY OF THE INVENTION

The technical task, as well as these and other objects, according to the present invention are achieved by a cooking device characterized in that it comprises a base which carries a bowl with electrical heating means and containing a basket for containing food to be cooked, this basket being connected to drive means suitable for moving it between a lower position inside the bowl and an upper position at least partially outside of it, the device also comprising a first sensor of the temperature of at least a portion of the bowl and a timer connected to means for controlling the drive means, for moving the basket, in response to signals that the control means receives from the temperature sensor and from the timer.

Suitably, the present invention also refers to a procedure for cooking through a device according to the invention where the heating means heats the water contained in the bowl taking it up to a predetermined temperature, at which point the first sensor detects that such a predetermined temperature has been reached and the basket is plunged into the water and, at the same time, the timer is started for a preset time period, at the end of which the control means deactivates the heating means and initiates the removal of the basket from the bowl.

BRIEF DESCRIPTION OF THE DRAWING

Further characteristics and advantages of the invention shall become clearer from the description of a preferred but not exclusive embodiment of the cooking device and procedure according to the present invention, where the device is shown in the attached drawings, in which.

SPECIFIC DESCRIPTION

Figure 1:
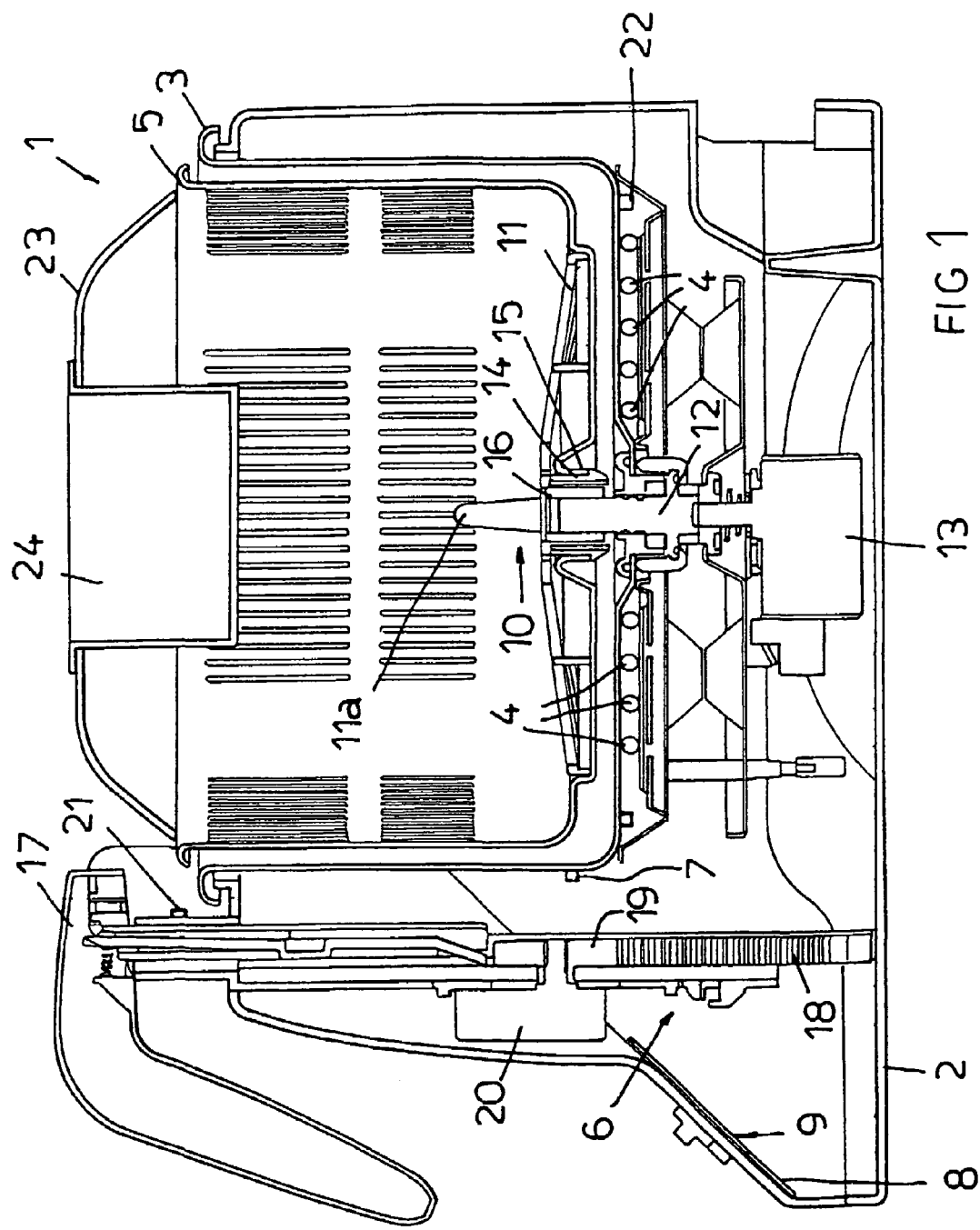
FIG. 1 shows a cross-section of the device according to the present invention.
Figure 2:
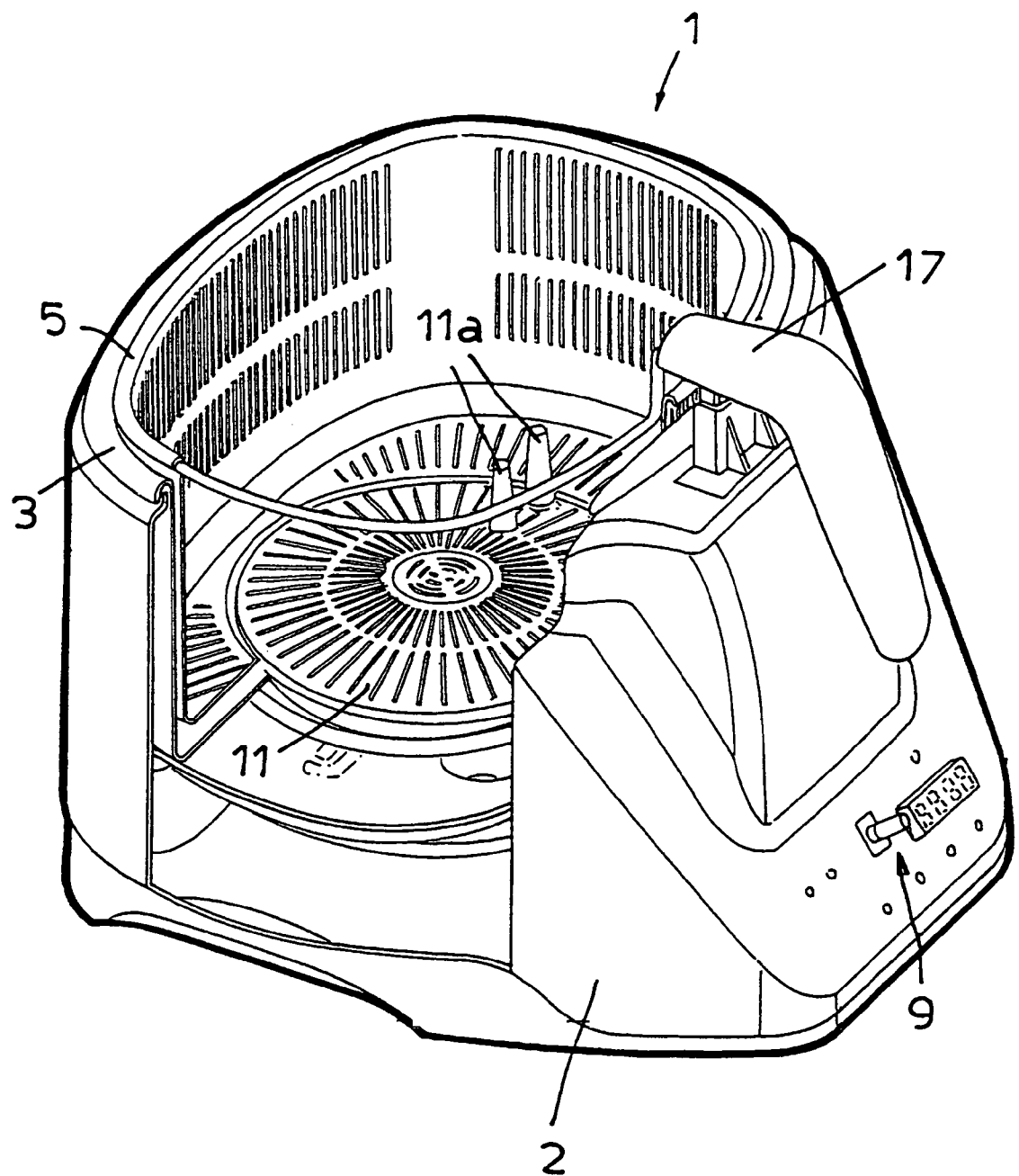
FIG. 2 shows a partial section perspective view of the device according to the invention.

With reference to the aforementioned figures, a cooking device is shown wholly indicated with reference numeral 1. The device 1 comprises a base 2 which carries a bowl 3 having electrical heating means 4, for example consisting of shielded resistances, and containing a basket 5 for containing the food to be cooked.

The basket 5 is connected to drive means 6 suitable for moving it between a lower position inside the bowl and an upper position at least partially outside of it. The device also comprises a first sensor 7 of the temperature of at least a portion of the bowl and a timer 8 connected to control means 9 (for example formed by a circuit board or else electromechanically) which, in turn, are connected to the drive means 6 so as to move the basket 5 in response to the signals which the control means 9 receives from the temperature sensor 7 and from the timer 8, between the lower position inside the bowl 3 and the upper position at least partially outside of it.

Figure 3:
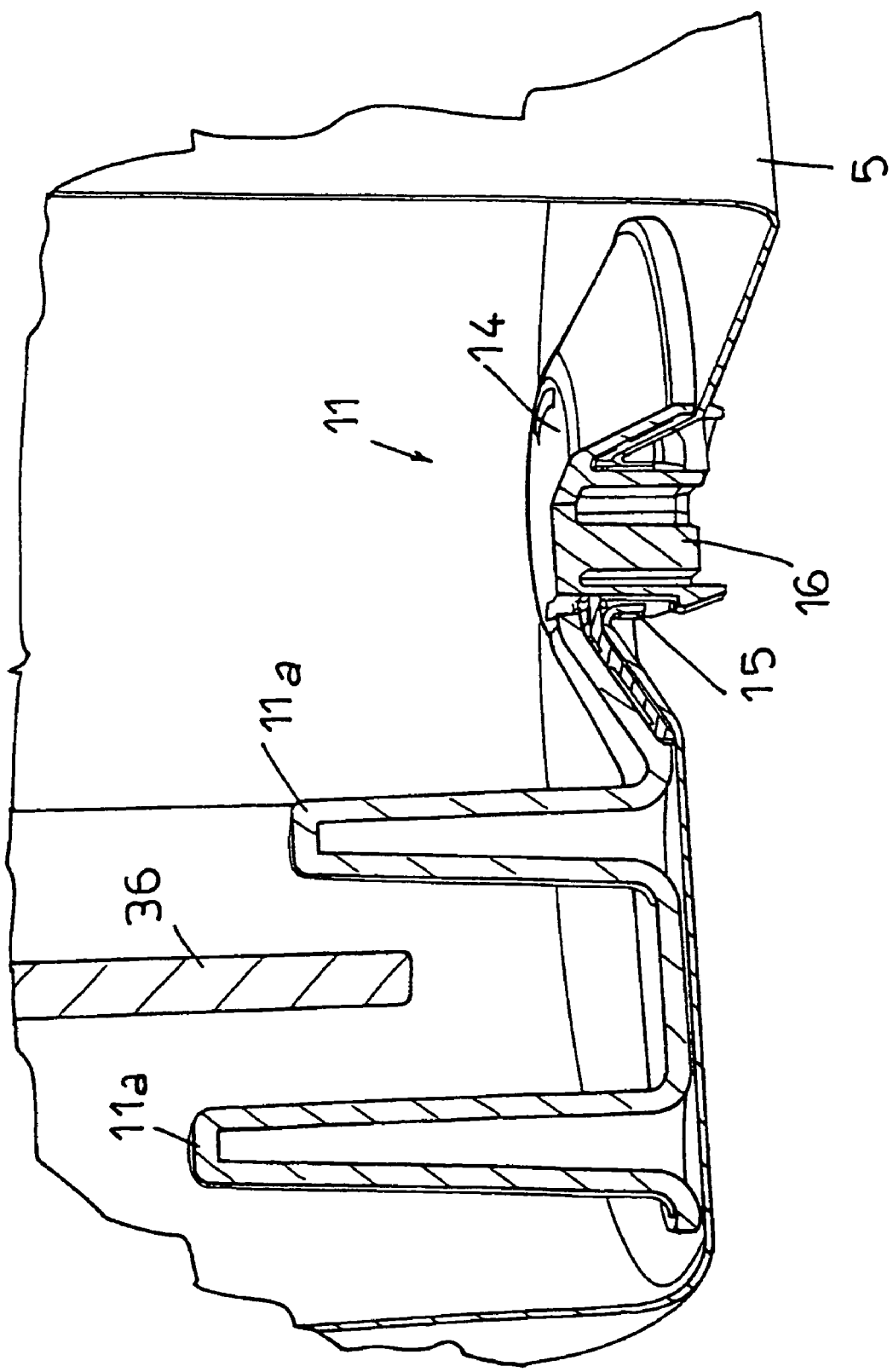
FIG. 3 shows a detail of a different embodiment of the device.

Moreover, the device 1 comprises means 10 for stirring the food contained inside the basket 5 which is also connected to the control means 9. In particular, the mixing means 10 comprises an element 11 rotatably connected to the basket 5 and removably connected to a drive element 12 which protrudes from the base 2 and is connected to a first motor 13. Preferably, the rotatable element 11 comprises a disk, for example with a grid, FIG. 1) substantially conical, from which protruding paddles 11*a* extend, and having a widened central portion 14 rotatably connected in a through-seat 15 formed on the base of the basket 5. Moreover, the widened central portion 14 defines a socket or is seat 16 suitable for receiving a portion of the drive element 12. figure FIG. 3 shows a different embodiment, in which the rotatable element 11 comprises an arm from which the protruding paddles 11*a* extend. The rotatable element 11 has the central portion 14 raised and rotatably connected in the through-seat 15 formed on the base of the basket 5. The raised central portion 14 defines the seat 16 suitable for receiving a portion of the drive element 12.

The drive means comprises a support for the basket 17 which has a rack 18 operatively connected to a pinion 19 capable of being actuated through a second motor 20, which is connected to the control means 9. Suitably, the device 1 comprises at least one second sensor 21 suitable for detecting the position of the basket 5, for example consisting of a microswitch, a photocell or a magnetic sensor.

Moreover, the bowl 3 is removably connected to the base 2, i.e. so that it can be taken out of it and put back in. In this way the bowl 3 can be removed for easy emptying of the water and cleaning.

Advantageously, to ensure safety, the device 1 comprises at least a third sensor 22 of the presence of the bowl 3 and a closing cover 23 applied above the basket 5 to allow the basket 5 itself to be moved without hindrance from the cover 23.

Advantageously, moreover, the cover 23 comprises at least one anti-foaming hatch (not shown for the sake of simplicity in the attached figures), free to oscillate from an open position to a closed position and vice-versa when the pressure inside the bowl 3 exceeds a predetermined value. In this way, during the cooking of pasta, when the typical cooking foam forms inside the bowl 3, the internal pressure tends to open the hatch allowing a large intake of air inside the bowl 3 and, therefore, a reduction of the foam. Moreover, the hatch 20 makes it also possible to monitor the progression of the cooking of the pasta or else to pick out a piece of pasta to taste it and check how much it is cooked, in the case in which one prefers pasta which is more or less cooked with respect to the optimal cooking instructions.

The cover 23 has a central hole in which a container 24 is housed suspended in the basket 5. For example, the container 23 is used for the sauce, so as to heat or cook the sauce at the same time as the pasta.

The device is also equipped with a control panel (not represented for the sake of simplicity), which allows the cooking times to be programmed and detected even in the time span of 24 hours. In this way it is possible to freely set the moment when one wishes to have the pasta drained. Suitably, moreover, when the device is not used the timer shows the time of day and functions as a clock.

The operation of the cooking device 1 according to the invention is clear from that which has been described and illustrated and, in particular, is substantially as described in the following. Hereafter, reference shall be made to the case in which the cooking of pasta is carried out immediately after the programming of the device and then the case in which the pasta is cooked at a predetermined time of day, for example the device is programmed and prepared in the morning to obtain the cooked and drained pasta at lunch.

In the first case (i.e. pasta cooked immediately after the programming of the device), beforehand the bowl 3 is filled with salted water, the pasta is inserted into the basket 5 which is in raised or upper position and the cooking time of the pasta is set. Then the device is switched on and the water is heated so that it boils. In practice, the boiling temperature is recognized when the sensor 7 detects, after switching on, a stable temperature below a predetermined temperature.

When the sensor 7 detects that the water is substantially close to boiling, the control means 9 commands the lowering of the basket 5 and the starting of the timer 8. At the same time a sound is also emitted through a buzzer (not represented).

After a certain time from the lowering of the basket into the bowl 3 the control means 9 actuates the motor 13 of the stirring means 10, to prevent the pasta from sticking. Advantageously, moreover, the control means 9 cyclically activates and deactivates the heating means 4 and stirring means 10, so as to reduce the energy transmitted to the water and to obtain a less turbulent boiling movement of the water, thereby producing less foam and obtaining a better stirring.

Suitably, a minute before the end of the set time, the buzzer is again activated by the control means 9 and emits an other sound. The cooking proceeds until the timer 8, when it detects the end of the set time, sends a signal to the control means 9 which deactivates the heating means 4 and lifts the basket 5.

In the second case (i.e. pasta cooked at a predetermined time of day) the control means 9 activates the heating means 3 at the set time, the control means checks (through the temperature sensor 7) the increase in temperature of the water (which depends upon the amount of water to be heated) and, in the case in which it is too quick, it interrupts the power supply to the electric means and calculates the waiting time before starting to heat again. Then the whole thing is carried out as described previously, with the heating means which takes the water to a temperature close to boiling and the basket which is lowered into the water for the cooking of the pasta and, when cooking is complete, it is removed.

Advantageously, the present invention also refers to a procedure for cooking with a device of the type described previously. The sensor 7 also functions as a safety element since when it detects a temperature higher than a safety temperature it interrupts the operation of the device. According to the procedure the heating means 4 heats the water contained in the bowl 3 up to a predetermined temperature, for example close to boiling. When the first sensor 7 detects that such a predetermined temperature has been reached the basket 5 is lowered into the water and, at the same time, the timer 8 is started for a preset period of time. When the timer 8 reaches the end of such a preset period of time the control means 9 deactivates the heating means 4 and removes the basket 5 from the bowl 3. Advantageously, moreover, after a predetermined period of time from the lowering of the basket 5 into the bowl 3 the stirring means 10 is actuated. Preferably, moreover, the heating means 4 and/or stirring means 10 are activated discontinuously, so as to reduce the power, to reduce the turbulence of the water and to reduce the production of foam.

Figure 4:
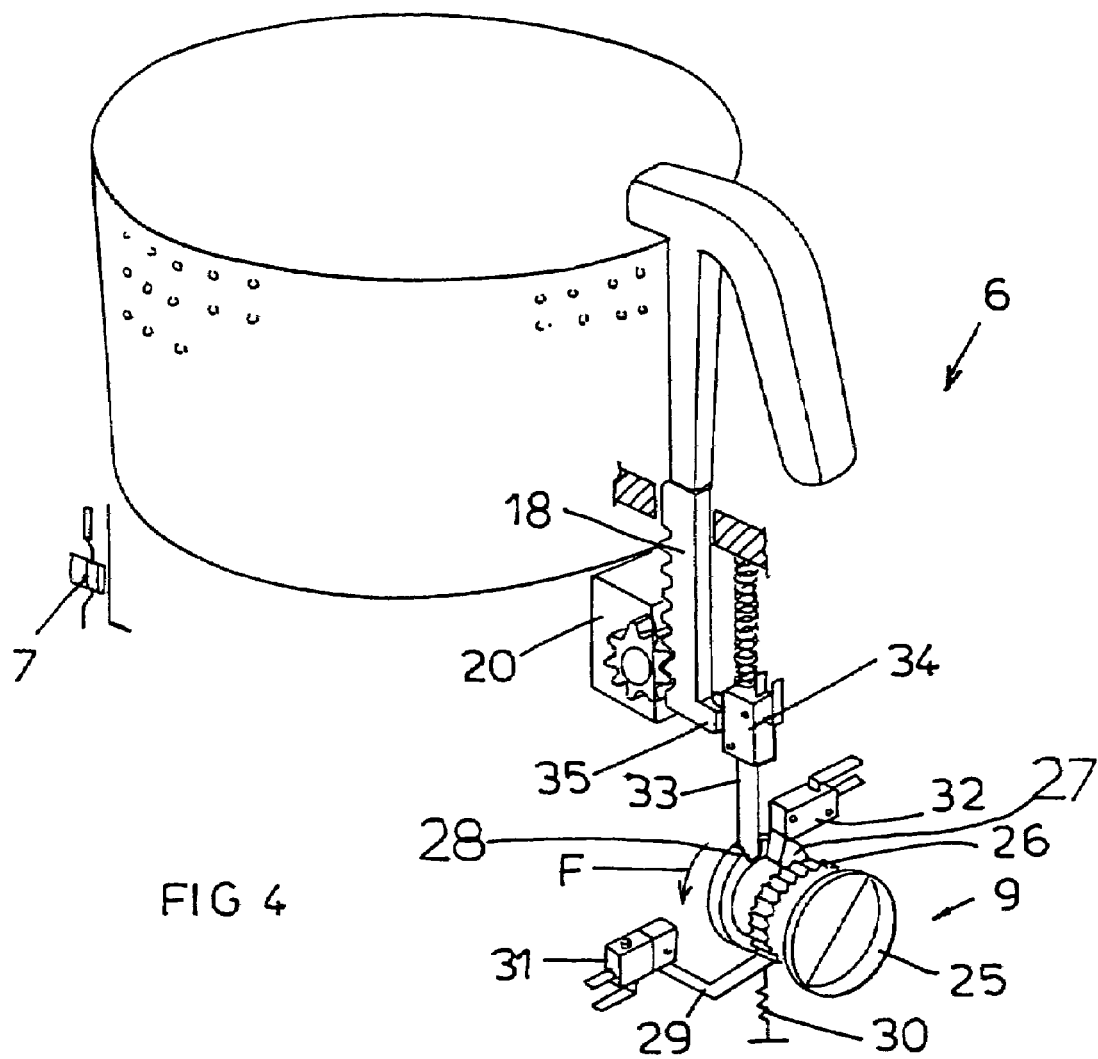
FIG. 4 shows a diagram of the device with control and drive means of the electromechanical type.
Figure 5:
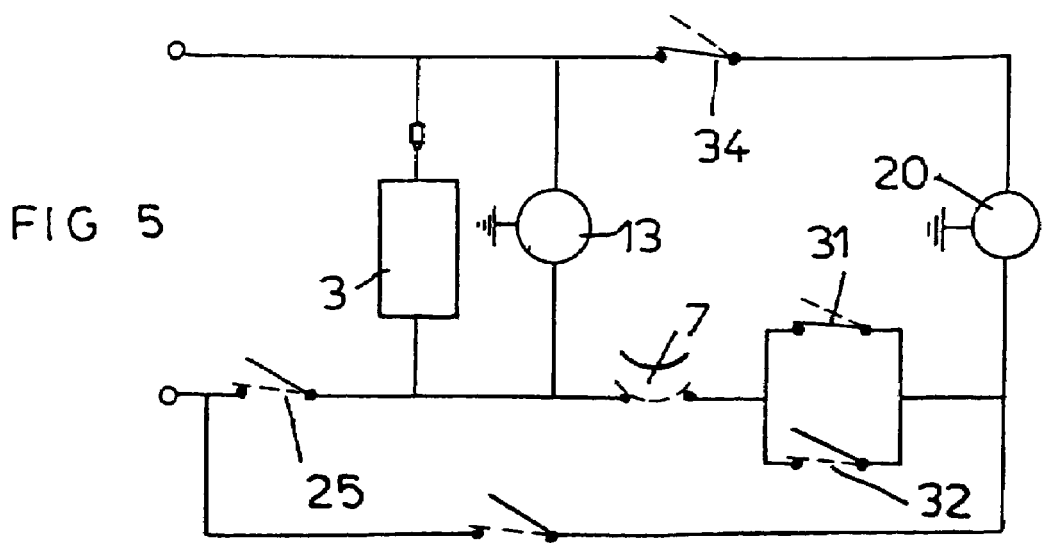
FIG. 5 shows a circuit diagram of the device of FIG. 4.

FIGS. 4 and 5 show a different embodiment of the device 1 in which the control means 9 and the drive means 6 are of the electromechanical type.

With particular reference to FIG. 4, an electromechanical timer 25 connected to the device 1 has a toothed portion 26 and two portions equipped with cams, a first cam 27 which protrudes and a second cam 28 which is grooved. The toothed portion 26 is associated with an arm 29 which has a toothed end kept in contact with the toothed portion 26 by a counter spring 30, and another end connected to a microswitch 31.

The teeth of the portion 26 are of the type which allows the toothed portion 26 and the arm 29 to be locked when the timer turns in one direction (i.e. preventing rotation of the timer in one direction) whereas it allows the sliding of the teeth past the arm in the opposite direction (therefore, for example, when the arm 29 and the toothed portion 26 are connected to each other the timer can rotate only in counterclockwise direction, as indicated by the arrow F).

The microswitch 31, moreover, is in the path of the rack 18, so that the rack 18, during its motion downward (to lower the basket 5), actuates the microswitch 31 which interrupts the power supply to the motor 20 and locks the basket 5 inside the bowl 3 sunk in the water. The cam 27 serves for actuating the microswitch 32 (the microswitch 32 is closed when it is connected to the cam) which turns on the power supply to the motor 20 and thus lifts the basket 5. In practice, when the cam 27 is connected to the microswitch 32 it closes the electric circuit of the device whereas when the cam 27 is not connected to the microswitch 32 (for example when the timer is set to cook pasta) the electric circuit of the device is open.

The grooved cam 28 is associated with a pin 33 connected to a further microswitch 34. The microswitch 34 serves for connection to a protruding portion 35 of the rack 18 so that, when the pin 33 is inserted in the grooved cam 28 and the basket is in upper position, the microswitch 34 is connected to the portion 35 of the rack 18 and the electric circuit of the device is open, whereas when the pin 33 is in contact with the cylindrical drum outside of the grooved cam 28, the microswitch 34 is not connected to the portion 35 and the electric circuit of the device 1 is closed.

The operation of the device 1 in this embodiment happens as substantially indicated hereafter, with particular reference to FIG. 5 which schematically shows the electric circuit of the device.

In rest position, i.e. when the device 1 is not used, the configuration of the switches is the one shown in solid lines (microswitch 31 closed, microswitch 32 closed, microswitch 34 open, sensor 7 open, the sensor 7 being of the THS type and being suitable for operating as a switch controlled by the temperature detected).

When the timer 25 is set the power supply to the heating means 3 and to the motor for the shaft 13 begins. The microswitch 32 is closed, the microswitch 31 remains closed (with the arm 29 which keeps the timer 25 locked) and the microswitch 34 is closed (since it is taken away from the portion 35), (microswitch 31 closed, microswitch 32 open, microswitch 34 closed, sensor 7 open). The temperature increases until, when around boiling temperature is reached, the sensor 7 closes and feeds electricity from the power supply to the motor 20 (through the microswitch 31 and 34) which lowers the basket into the bowl 3 (microswitch 31 closed, microswitch 32 open, microswitch 34 closed, sensor 7 closed).

During downward motion the rack 18 meets the microswitch 31, opens it (interrupting the flow of current) and stops the basket 5 inside the bowl 3 (microswitch 31 open, microswitch 32 open, microswitch 34 closed, sensor 7 closed). At the same time the rack 18 displaces the arm 29, moving it away from the toothed portion 26 and allowing the start of the counting by the timer of the cooking time of the pasta. During the counting of the timer 25, the cams 27 and 28 rotate.

When the timer has almost stopped counting the cam 27 closes the microswitch 32 and actuates the motor 20 which lifts the basket 5 removing it from the bowl 3. At the same time the pin 33 starts descend since it starts to insert inside the grooved cam 28 (microswitch 31 open, microswitch 32 closed, microswitch 34 closed, sensor 7 closed).

When during lifting the portion 35 opens the microswitch 34, the power supply to the motor 20 is interrupted and the basket 5 remains suspended on the bowl 3 out of the water (the microswitches go back into the starting configuration—microswitch 31 closed, microswitch 32 closed, microswitch 34 open).

Figure 6:
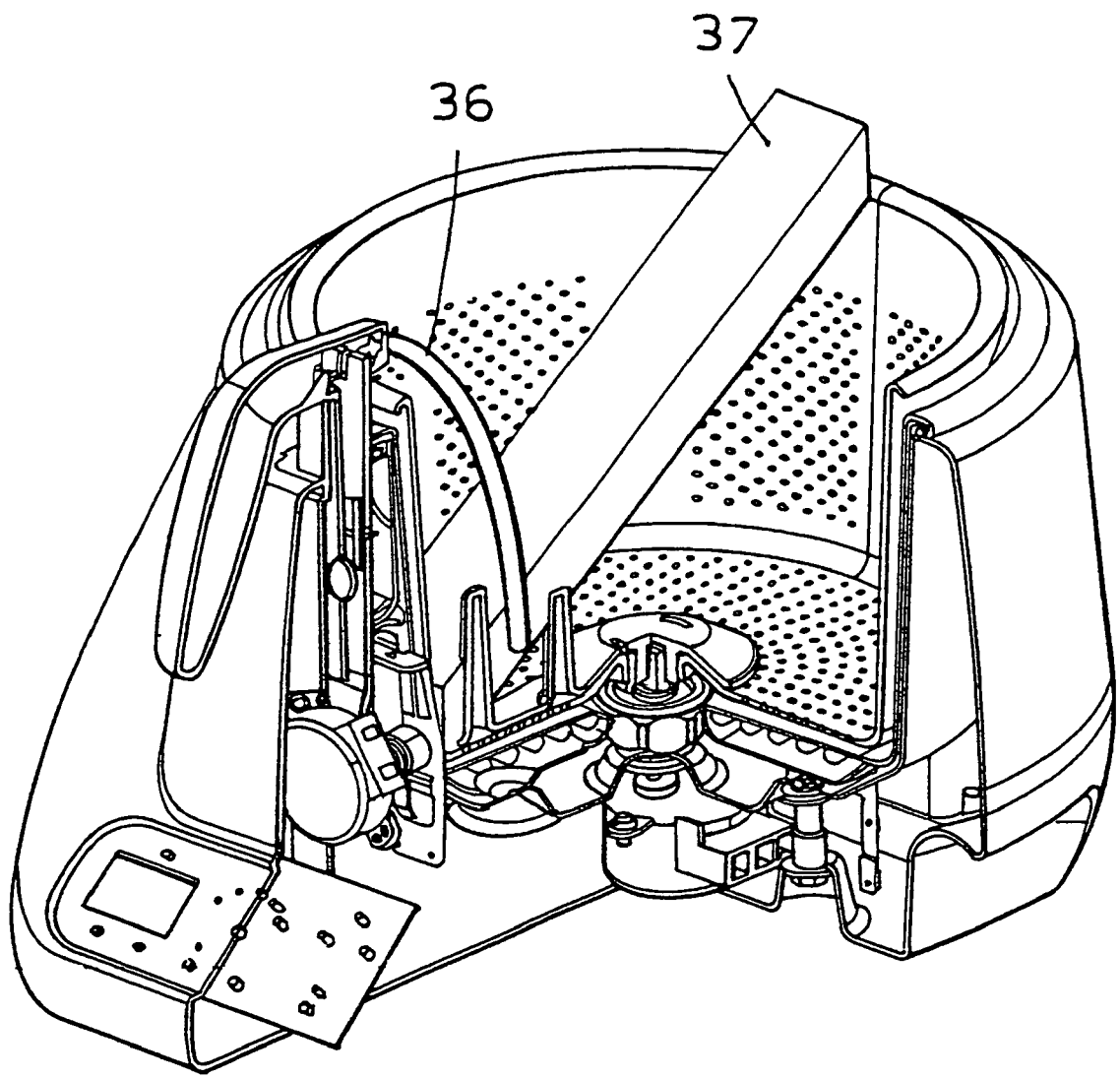
FIG. 6 shows a partial section view of a device equipped with an anti-rotation element for the pasta.

FIGS. 3 and 6 show another embodiment of the device according to the invention equipped with anti-rotation means 36 for the pasta. In particular, the anti-rotation means 36 comprises a fixed anti-rotation element connected to a fixed part of the device 1 and inserted inside the basket 5 and the bowl 3. Preferably, such a fixed anti-rotation element 36 has an end placed between the paths of the paddles 11a and has a portion connected to the top of the support 2 and forming a handle.

In the attached figures as an example the space taken up by spaghetti is also represented, wholly indicated with reference numeral 37. Advantageously, when the stirring means 10 (such as the shaft) rotates, the anti-rotation means prevents the pasta from rotating together with it and ensures excellent stirring.

Figure 7:
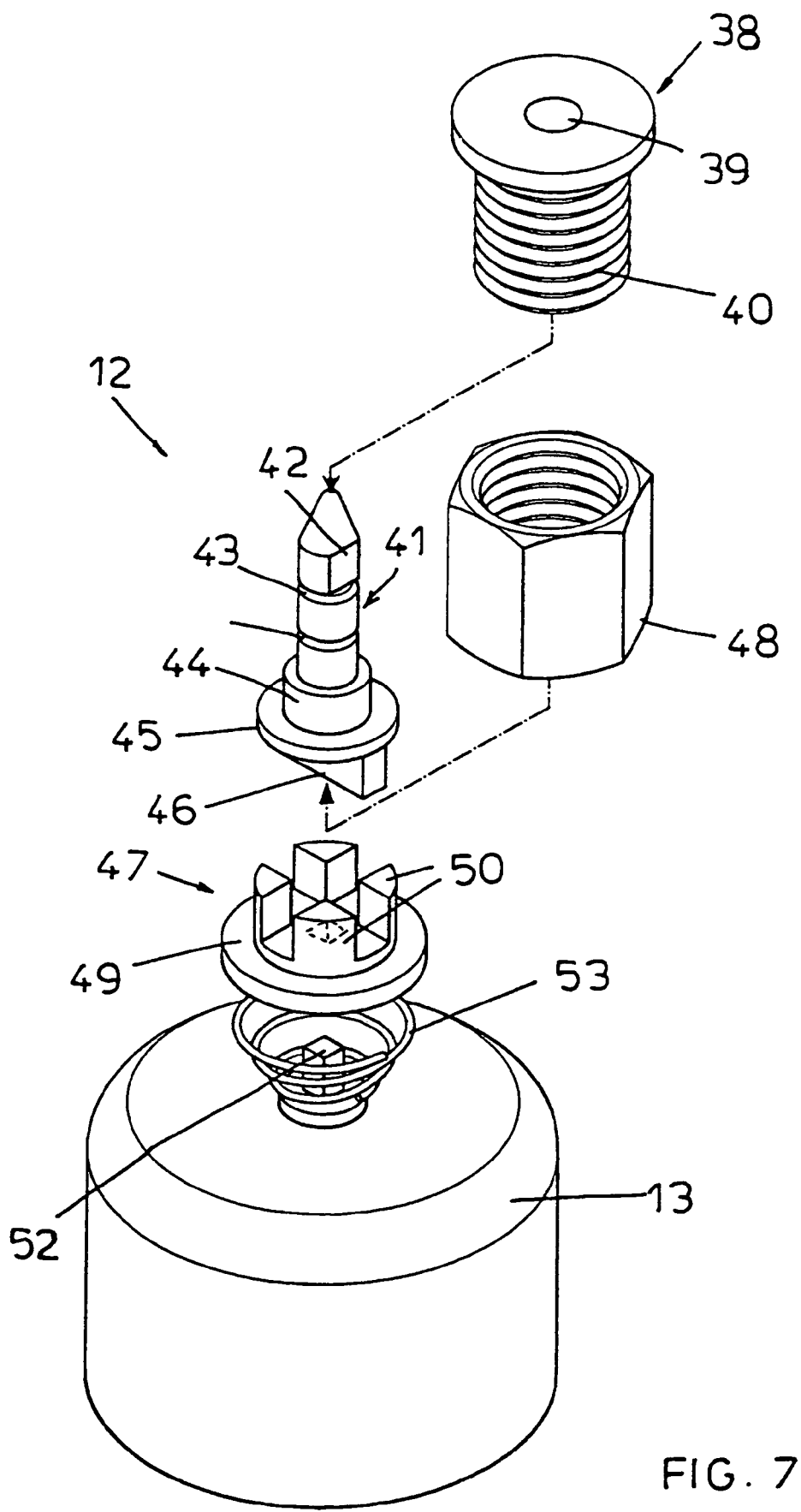
FIG. 7 shows a drive element.

FIG. 7 shows a drive element 12 comprising a pin guide 38 slidably connected to the basket 5 and having an inner hole 39 which is at least partially faceted and a threaded lower portion 40. A drive pin 41 is inserted into the hole 39 (without the possibility of rotating). The pin 41 has a faceted portion 42 and two grooves 43 which house seals (not shown). The lower part 44 of the pin is widened and is coated in Teflon to promote sliding. The pin 41, at the bottom, has an outer edge flange 45 and a blade 46 suitable for connecting to a connection element 47 of the motor 13. The pin 41 is connected to the pin guide 38 (and thus to the basket 5) by the nut 48. The connection element 47 comprises a disk 49 which has four protruding pins 50 (for example with a triangular section) and a square hole in which the drive shaft 52 (also square) of the motor 13 is slidably inserted. Moreover, a spring 53, which allows gaps to be closed, is placed between the case of the motor 13 and the disk 49. When the basket 5 is lowered the blade 46 fits between the pins 50 and ensures the connection and the actuation of the stirring means 10. If the blade 46 locks above the pins 50 the rotation of the disk 49 and the push of the spring 53 take the drive element 12 back to correct configuration.

In practice, it has been noted how the cooking device and procedure according to the invention are particularly advantageous because they allow the cooking of pasta in particular, but also other dishes, without the need for it to be watched over continuously and always ensuring optimal results. For example, indeed, the device according to the present invention also allows rice, custard, mousses, soups, polenta, etc. to be cooked. Moreover, advantageously, the device can also be used for steam-cooking food. The cooking device and procedure thus conceived are susceptible of numerous modifications and variants, all covered by the inventive concept. Moreover, all of the details can be replaced with technically equivalent elements. In practice, the materials used, as well as the sizes, can be whatever according to the requirements and the state of the art.

The invention claimed is:

1. A cooking device comprising:
   a base;
   a bowl on the base and capable of holding water;
   electrical heating means juxtaposed with the bowl for heating water therein;
   a basket fittable in the bowl and shiftable between a lower position immersed in the water in the bowl and an upper a position largely out of the water in the bowl;
   a closing cover applied on said basket;

first drive means connected between the basket and the base for shifting the basket between its upper and lower positions;

first sensor means for detecting a temperature of water inside the bowl;

a timer settable to different predetermined time intervals;

control means connected to the first sensor means, the first drive means, and to the timer for starting the timer and moving the basket from the upper position to the lower position when the sensor means detects that the water in the bowl is above a predetermined temperature and for moving the basket from the lower position to the upper position after a preset time interval as set in the timer.

2. The cooking device according to claim 1 wherein said cover comprises at least one anti-foam door free to oscillate from an open position to a closed position and vice-versa when the pressure inside said bowl exceeds a predetermined value.

3. The cooking device according to claim 1 wherein said cover has a hole in which a container is housed suspended in said basket.

4. A cooking device comprising:
a base;
a bowl on the base and capable of holding water;
electrical heating means juxtaposed with the bowl for heating water therein;
a basket fittable in the bowl and shiftable between a lower position immersed in the water in the bowl and an upper position largely out of the water in the bowl;
first drive means connected between the basket and the base for shifting the basket between its upper and lower positions;
first sensor means for detecting a temperature of water inside the bowl;
a timer settable to different predetermined time intervals;
control means connected to the first sensor means, the first drive means, and to the timer for starting the timer and moving the basket from the upper position to the lower position when the sensor means detects that the water in the bowl is above a predetermined temperature and for moving the basket from the lower position to the upper position after a preset time interval as set in the timer;
at least one stirring element rotatably mounted on the basket and carrying a paddle projecting upward into the basket; and
second drive means on the base couplable with the stirring element only in the lower position of the bowl for orbiting the paddle in the bowl and thereby stirring the water therein.

5. The cooking device according to claim 4 wherein said rotatable element comprises a substantially conical disk with a widened central portion rotatably connected in a through-seat on a base of said basket, said widened central portion defining a seat suitable for engagement with the second drive means only in the lower position of the basket.

6. The cooking device according to claim 4 wherein said rotatable element comprises a shaft which has a central portion rotatably connected in a through-seat realized on the base of said basket, said central portion defining a seat suitable for receiving a portion of the second drive means.

7. The cooking device according to claim 4 wherein said first drive means comprises a rack mounted on the basket and operatively connected to a pinion which can be actuated by a motor connected to said control means.

8. The cooking device according to claim 4, further comprising
at least one second sensor means for detecting the position of said basket.

9. The device according to claim 8 wherein the control means is connected to the second sensor means for deenergizing the heating means after movement of the basket from the lower position to the upper position.

10. The cooking device according to claim 4 wherein said bowl is removably connected to said base.

11. The cooking device according to claim 4, further comprising at least one third sensor of the presence of said bowl.

12. The cooking device according to claim 4 wherein said control means and said first drive means are of the electromechanical type.

13. The cooking device according to claim 4, further comprising anti-rotation means for the pasta.

14. The cooking device according to claim 13 wherein said anti-rotation means comprises a fixed anti-rotation element connected to the base and projecting downward into said basket and said bowl.

15. The cooking device according to claim 14 wherein said fixed anti-rotation element has an end placed offset from an orbit of the paddle.

16. The device according to claim 14 wherein the stirring element is rotatable about an upright axis and carries two of the paddles offset radially from each other and defining respective offset orbits when the stirring element is rotated, the anti-rotation element projecting into the bowl between the orbits of the two paddles.

17. The cooking device according to claim 4 wherein said second drive means comprises
a pin guide slidably connected to said basket and with a hole and a threaded lower portion,
a second drive motor on the base having a connection element, and
a pin seated in the guide and having an upper end connected to the stirring element and a lower end formed with a blade suitable for connecting to the connection element of the second drive motor.

18. The cooking device according to claim 17 wherein said connection element comprises a disk which has a plurality of protruding pins and a hole in which a drive shaft of said second motor is slidably inserted, and
a spring braced between the base and said disk and urging the disk upward into engagement with the blade.

* * * * *